US009280848B1

(12) United States Patent
Chen et al.

(10) Patent No.: US 9,280,848 B1
(45) Date of Patent: Mar. 8, 2016

(54) RENDERING IMAGES WITH VOLUMETRIC SHADOWS USING RECTIFIED HEIGHT MAPS FOR INDEPENDENCE IN PROCESSING CAMERA RAYS

(75) Inventors: Jiawen Chen, Cambridge, MA (US); Ilya Baran, Zürich (CH); Frédo Durand, Boston, MA (US); Wojciech Jarosz, Zürich (CH)

(73) Assignee: Disney Enterprises Inc., Burbank, CA (US)

( * ) Notice: Subject to any disclaimer, the term of this patent is extended or adjusted under 35 U.S.C. 154(b) by 814 days.

(21) Appl. No.: 13/280,212

(22) Filed: Oct. 24, 2011

(51) Int. Cl.
*G06T 15/60* (2006.01)
*G06T 15/50* (2011.01)
*G06T 15/80* (2011.01)
*G06T 15/06* (2011.01)

(52) U.S. Cl.
CPC .............. *G06T 15/506* (2013.01); *G06T 15/06* (2013.01); *G06T 15/50* (2013.01); *G06T 15/60* (2013.01); *G06T 15/80* (2013.01)

(58) Field of Classification Search
USPC ......... 345/426, 582, 424, 422, 419, 584, 421; 382/154
See application file for complete search history.

(56) References Cited

U.S. PATENT DOCUMENTS

| 5,914,807 | A | 6/1999 | Downing | |
|---|---|---|---|---|
| 6,097,394 | A * | 8/2000 | Levoy | G02B 27/2271 345/419 |
| 7,386,164 | B2 * | 6/2008 | Shragai et al. | 382/154 |
| 7,423,645 | B2 | 9/2008 | Dougherty et al. | |
| 7,982,734 | B2 * | 7/2011 | Miller | 345/426 |
| 8,064,726 | B1 | 11/2011 | d-Eon et al. | |
| 8,207,968 | B1 | 6/2012 | Krishnaswamy et al. | |
| 8,379,021 | B1 * | 2/2013 | Miller et al. | 345/426 |
| 8,923,603 | B2 * | 12/2014 | Weston | G01B 11/007 345/419 |
| 2005/0243089 | A1 | 11/2005 | Johnston | |
| 2005/0280648 | A1 * | 12/2005 | Wang et al. | 345/420 |
| 2009/0010495 | A1 * | 1/2009 | Schamp et al. | 382/106 |
| 2009/0033661 | A1 * | 2/2009 | Miller | 345/426 |
| 2010/0329543 | A1 * | 12/2010 | Li et al. | 382/154 |
| 2011/0069069 | A1 * | 3/2011 | Engel | 345/426 |
| 2012/0038645 | A1 | 2/2012 | Norrby | |

(Continued)

OTHER PUBLICATIONS

Greg Nichols; Multiresolution Splatting for Indirect Illumination; Mar. 1, 2009; pp.: 83-90.*

(Continued)

*Primary Examiner* — Abderrahim Merouan
(74) *Attorney, Agent, or Firm* — Kilpatrick Townsend & Stockton LLP

(57) ABSTRACT

Rendering a scene with participating media is done by generating a depth map from a camera viewpoint and a shadow map from a light source, converting the shadow map using epipolar rectification to form a rectified shadow map (or generating the rectified shadow map directly), generating an approximation to visibility terms in a scattering integral, then computing a 1D min-max mipmap or other acceleration data structure for rectified shadow map rows and traversing that mipmap/data structure to find lit segments to accumulate values for the scattering integral for specific camera rays, and generating rendered pixel values that take into account accumulated values for the scattering integral for the camera rays. The scattering near an epipole of the rectified shadow map might be done using brute force ray marching when the epipole is on or near the screen. The process can be implemented using a GPU for parallel operations.

32 Claims, 9 Drawing Sheets

(56) References Cited

U.S. PATENT DOCUMENTS

| | | | |
|---|---|---|---|
| 2012/0262457 A1* | 10/2012 | Gautron et al. | 345/426 |
| 2012/0263373 A1* | 10/2012 | Walter et al. | 382/154 |
| 2012/0320712 A1* | 12/2012 | Aqrawi et al. | 367/53 |
| 2013/0335406 A1 | 12/2013 | Tabellion | |
| 2014/0267249 A1 | 9/2014 | Cooper et al. | |

OTHER PUBLICATIONS

Jiawen Chen, Real-Time Volumetric Shadows using 1D Min-Max Mipmaps, Feb. 18, 2015, ACM 978-1-4503-0565-5/11/0002.*

Baran, I., et al., "A hierarchical volumetric shadow algorithm for single scattering," ACM Transactions on Graphics, 2010, vol. 29, No. 5, pp. 10 pages.

Billeter, M., et al., "Real time volumetric shadows using polygonal light volumes," Proc. High. Performance Graphics, 2010, 7 pages.

Carr, N. A., et al., "Fast GPU ray tracing of dynamic meshes using geometry images," Graphics Interface, 2006, pp. 203-209.

Dobashi, Y., et al., "Interactive rendering method for displaying shafts of light," Proc. Pacific Graphics, 2000, IEEE Computer Society, Washington, DC, USA, vol. 31, 8 pages.

Dobashi, Y., et al., "Interactive rendering of atmospheric scattering effects using graphics hardware," Proc. Graphics hardware, 2002, pp. 99-107.

Engelhardt, T., et al., "Epipolar sampling for shadows and crepuscular rays in participating media with single scattering," Proc. 2010 ACM SIGGRAPH symposium on Interactive 3D Graphics and Gaines, ACM, 2010, pp. 119-125.

Hu, W., et al., "Interactive volume caustics in single scattering media," I3D '10: Proceedings of the 2010 symposium on Interactive 3D graphics and games, 2010, ACM, pp. 109-117.

Imagire, T., et al., "Anti-aliased and real-time rendering of scenes with light scattering effects," The Visual Computer, Sep. 2007, pp. 935-944.

Jarosz, W., et al., "The beam radiance estimate for volumetric photon mapping," Computer Graphics Forum, Apr. 2008, vol. 27, No. 2, pp. 557-566.

Jensen, H. W., et al., "Efficient simulation of light transport in scenes with participating media using photon maps," Proc. SIGGRAPH 95, 1998, pp. 311-320.

Lokovic, T., et al., "Deep shadow maps," Proceedings of ACM SIGGRAPH 2000, Computer Graphics Proceedings, Annual Conference Series, 2000, pp. 385-392.

Mastin, G. A., et al., "Fourier synthesis of ocean scenes," IEEE Computer Graphics & Applications, Mar. 1987, pp. 16-23.

Max, N. L., "Atmospheric illumination and shadows," Computer Graphics (Proc. SIGGRAPH '86), ACM, 1986, pp. 117-124.

Musgrave, F. K., et al., "The synthesis and rendering of eroded fractal terrains" Computer Graphics (Proceedings of SIGGRAPH 89), 1989, pp. 41-50.

Nichols, G., et al., "Multiresolution splatting for indirect illumination," ACM Symposium on Interactive 3D Graphics and Games, ACM, 2009, pp. 83-90.

Pegoraro, V., et al., "An analytical solution to single scattering in homogeneous participating media," Computer Graphics Forum, 2009, vol. 28, No. 2, 7 pages.

Pegoraro, V., et al., "A closed-form solution to single scattering for general phase functions and light distributions," Computer Graphics Forum, 2010, vol. 29, No. 4, pp. 1365-1374.

Sun, B., et al., "A practical analytic single scattering model for real time rendering," ACM Trans. Graph., 2005, vol. 24, No. 3, 10 pages.

Sun, X., et al., "Line space gathering for single scattering in large scenes," ACM Trans. Graph., 2010, vol. 29, No. 4, 2010.

Tevs, A., et al., "Maximum mipmaps for fast, accurate, and scalable dynamic height field rendering," Symposium on Interactive 3D Graphics and Games.(i3D '08), 2008, pp. 183-190.

Wyman, C., et al., "Interactive volumetric shadows in participating media with single-scattering," Proc. IEEE Symposium on Interactive Ray Tracing, 2008, pp. 87-92.

Blinn, James F., "Light Reflection Functions for Simulation of Clouds and Dusty Surfaces," Computer Graphics, Jul. 1982, vol. 16, No. 3, 9 pages.

Guennebaud, Gael, et al., "Real-time soft shadow mapping by backprojection," Eurographics Symposium on Rendering, Toulouse, France, 2006, 8 pages.

Chen, J. et al., Real-Time Volumetric Shadows using 1D Min-Max Mipmaps, I3D '11 Symposium on Interactive 3D Graphics and Games, (2011), ACM New York, NY, USA, pp. 39-46.

Angelidis, A. et al., "A controllable, fast and stable basis for vortex based smoke simulation", SCA, Eurographics Association, 2006, pp. 25-32.

Chandrasekar, S., "Radiative Transfer," 1960, Dover Publications, New York, New York.

Christensen, P. H., "Point-based approximate color bleeding", Pixar Technical Memo, Jul. 1, 2008.

Cook, R. L. et al., "The reyes image rendering architecture," Computer Graphics (Proceedings of SIGGRAPH 87), 1987, vol. 21, No. 4, pp. 95-102.

Engelhardt, T. et al., "Instant multiple scattering for interactive rendering of heterogeneous participating media," Technical Report, Karlsruhe Institute of Technology, Dec. 8, 2010, 9 pages.

Fedkiw, R. et al., "Visual simulation of smoke", Proceedings of ACM SIGGRAPH 2001, Computer Graphics Proceedings, Annual Conference Series, 2001, pp. 15-22.

Hachisuka, T. et al., "Stochastic progressive photon mapping," ACM Transactions on Graphics (TOG), Dec. 2009, 8 pages.

Hachisuka, T. et al., "Progressive photon mapping," ACM Transactions on Graphics (TOG), vol. 27, No. 5, ACM, 2008, 7 pages.

Havran, V. et al., "Ray maps for global illumination," Rendering Techniques, 2005, 14 pages.

Herzog, R. et al., "Global illumination using photon ray splatting," Computer Graphics Forum, vol. 26, No. 3, Sep. 2007. 11 pages.

Hong, J.-M. et al., "Wrinkled flames and cellular patterns," ACM Transactions on Graphics, 2007, vol. 26, No. 3, pp. 1-6.

Jarosz, Wojciech et al., "A comprehensive theory of volumetric radiance estimation using photon points and beams," ACM Transactions on Graphics, 2011, vol. 30, No. 1, pp. 1-19.

Jarosz, Wojciech et al., "Progressive Photon Beams," ACM SIGGRAPH Asia 2011, vol. 30, Issue 6, 11 pages.

Kajiya, J. T., "The rendering equation," in Computer Graphics (Proceedings of SIGGRAPH 86), 1986, vol. 20, No. 4, pp. 143-150.

Kerr, W. B. et al., "Toward evaluating lighting design interface paradigms for novice users," ACM Transactions on Graphics, 2009, vol. 28, No. 3, pp. 1-9.

Kerr, W. B. et al., "Toward evaluating material design interface paradigms for novice users," ACM Transactions on Graphics, 2010, vol. 29, No. 4, pp. 1-10.

Kerr, William B. et al., "BendyLights: Artistic control of direct illumination by curving light rays," Eurographics Symposium on Rendering, 2010, vol. 29, No. 4.

Knaus, C. et al., "Progressive photon mapping: A probabilistic approach," ACM Transactions on Graphics, 2011, 14 pages.

Křivánek, J. et al., "Global illumination across industries," SIGGRAPH Courses, ACM, 2010.

Kruger, J. et al., "Interactive screen-space accurate photon tracing on GPUs" Eurographics Symposium on Renderings, 2006, 12 pages.

Lafortune, E. P. et al., "Bi-directional path tracing," Proceedings of Compugraphics, vol. 93, 1993, 8 pages.

Lafortune, E. P. et al., "Rendering participating media with bidirectional path tracing," Eurographics Workshop on Rendering, 1996, 11 pages.

Lastra, M. et al., "A particle-path based method for Monte-Carlo density estimation," Eurographics Workshop on Rendering, 2002, 8 pages.

Liktor, G. et al., "Real-time volume caustics with adaptive beam tracing," Symposium on Interactive 3D Graphics and Games, ACN Press, New York, NY, 2011, 8 pages.

McGuire, M. et al., "Hardware-accelerated global illumination by image space photon mapping," HPG, ACM, 2009, 12 pages.

McNamara, A. et al., "Fluid control using the adjoint method" ACM Transactions on Graphics, 2004, vol. 23, pp. 449-456.

(56) References Cited

OTHER PUBLICATIONS

Nowrouzezahrai, D et al., "A Programmable System for Artistic Volumetric Lighting", '11 SIGGRAPH, ACM (Aug. 2011), ACM New York, NY, USA, 8 pages.

Nowrouzezahrai, D et al., "A Programmable System for Artistic Volumetric Lighting: Supplemental Document ", '11 SIGGRAPH, ACM (Aug. 2011), ACM New York, NY, USA, 3 pages.

Obert, J. et al., "iCheat: A representation for artistic control of indirect cinematic lighting," Computer Graphics Forum, 2008, vol. 27, No. 4, pp. 1217-1223.

Obert, J. et al., "Visibility editing for all-frequency shadow design," Comput. Graph. Forum, 2010, vol. 29, No. 4, pp. 1441-1449.

Parker, S. G. et al., "Optix: A general purpose ray tracing engine," ACM Transactions on Graphics. Jul. 2010, 13 pages.

Pauly, M. et al., "Metropolis light transport for participating media," Rendering Techniques, 2000, 13 pages.

Pellacini, F. et al., "Lighting with paint," ACM Transactions on Graphics, vol. 26, No. 2, 2007, 1-14.

Pellacini, F., "envylight: An interface for editing natural illumination," ACM Transactions on Graphics, vol. 29, No. 4, 2010, 1-8.

Perlin, K., "Noise hardware: Real-time Shading," ACM SIGGRAPH Course Notes, 2001, 26 pages.

Raab, M. et al., "Unbiased global illumination with participating media," Monte Carlo and Quasi-Monte Carlo Methods, 2006, 16 pages.

Sadeghi, Iman et al., "An artist friendly hair shading system," ACM Transactions on Graphics, 2010, vol. 29, No. 4.

Schjoth, L. et al., "Photon differentials," GRAPHITE, ACM, New York, 2007, 8 pages.

Schmid, J. et al., "Programmable motion effects," ACM Transactions on Graphics vol. 29, No. 4, 2010, 1-9.

Selle, A. et al., "Cartoon rendering of smoke animations," In Non-photorealistic Animation and Rendering, ACM, 2004, pp. 57-60.

Song, Y. et al., "Subedit: A representation for editing measured heterogeneous subsurface scattering," ACM Transactions on Graphics, vol. 28, No. 3, 2009, 1-10.

Szirmay-Kalos, L. et al., "Free path sampling in high resolution inhomogeneous participating media," Computer Graphics Forum, 2011, 12 pages.

Tabellion, E. et al., "An approximate global illumination system for computer generated films," ACM Transactions on Graphics, Aug. 3, 2004, vol. 23, pp. 469-476.

Tessendorf, J. et al., "Resolution independent volumes," ACM SIGGRAPH 2010 Courses, SIGGRAPH.

Treuille, A. et al., "Keyframe control of smoke simulations," ACM Transactions on Graphics (SIGGRAPH 2003), Jul. 3, 2003, vol. 22, pp. 716-723.

Veach, E. et al., "Metropolis light transport," Proceedings of SIGGRAPH 97, Computer Graphics Proceedings, Annual Conference Series, 1997, 13 pages.

Veach, E. et al., "Bidirectional estimators for light transport," Fifth Eurographics Workshop on Rendering, 1994, 20 pages.

Walter, B. et al., "Single scattering in refractive media with triangle mesh boundaries," ACM Transactions on Graphics 2009, vol. 28, Jul. 3, 2009, 1-8.

Williams, L., "Casting curved shadows on curved surfaces," Computer Graphics (Proceedings of SIGGRAPH 78), 1978, pp. 270-274.

Yue, Y. et al., "Unbiased, adaptive stochastic sampling for rendering inhomogeneous participating media," ACM Transactions on Graphics, 2010, 7 pages.

U.S. Appl. No. 13/235,299, filed Sep. 16, 2011.
U.S. Appl. No. 13/280,258, filed Oct. 24, 2011.
U.S. Appl. No. 14/164,358, filed Jan. 27, 2014.

\* cited by examiner

Directional Light

Point Source

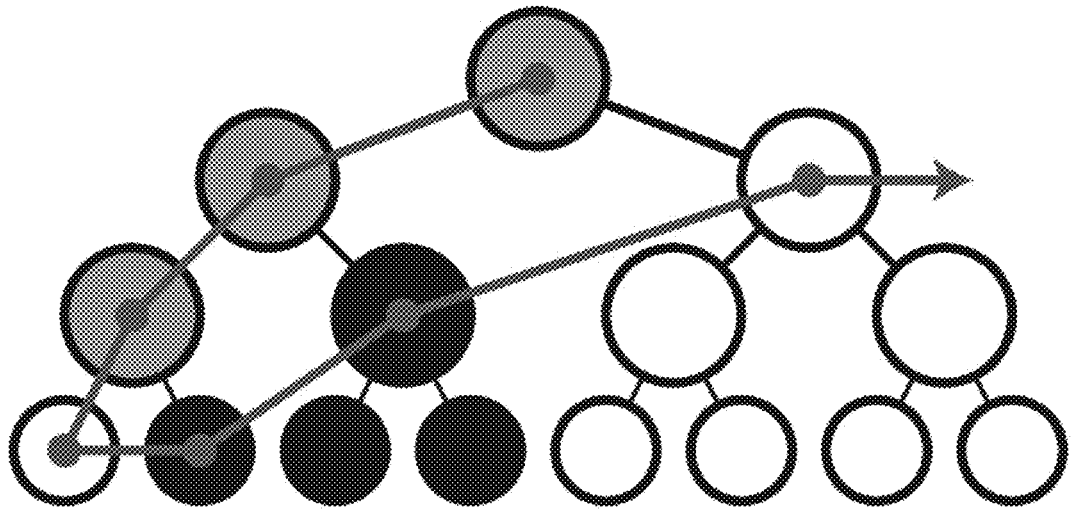

FIG. 7 proc INTEGRATE-RAY $(x, y)$ 1  float $depth = D\,[x, y]$
2  float $(\alpha, \beta, \gamma_1) = $ TO-EPIPOLAR$(x, y, depth)$
3  int $node = 1$  // start at the root
4  int2 $(\gamma_-, \gamma_+) = $ RANGE$(node)$
5  float4 $out = (0,0,0,0)$
6  do
7     if $min[node, \alpha] \le \beta < max[node, \alpha]$
8        $node = node * 2$  // recurse to left child
9     else  // fully lit or fully shadowed
10       if $\beta < min[node, \alpha]$  // fully lit node
11          $out = out + \Gamma_{sum}[min(\gamma_1, \gamma_+)] - \Gamma_{sum}[\gamma_-]$
12       end if
13       $node = node + 1$  // advance to next node
14       while $node$ is even  // while node is a left-child
15          $node = node / 2$  // go to parent
16       end while
17    end if
18    $(\gamma_-, \gamma_+) = $ RANGE$(node)$
19 while $node \ne 1$ && $\gamma_1 > \gamma_-$  // while ray extends into node
20 return dot$(B[\beta], out)$

FIG. 8

RENDERING IMAGES WITH VOLUMETRIC SHADOWS USING RECTIFIED HEIGHT MAPS FOR INDEPENDENCE IN PROCESSING CAMERA RAYS

BACKGROUND

Computer-generated imagery typically involves using software and/or hardware to generate one or more images from a geometric model. A geometric model defines objects, light sources, and other elements of a virtual scene and a rendering system or other computer/software/hardware system will read in the geometric model and determine what colors are needed in what portions of the image. A renderer will generate a two-dimensional ("2D") array of pixel color values that collectively result in the desired image or images.

For a simple geometric model, such as a cube in a vacuum with a single light source, a simple computer program running on most computer hardware could render the corresponding image in a reasonable amount of time without much optimization effort. However, there are many needs—in the entertainment industry and beyond—for methods and apparatus that can efficiently process complex interactions of virtual objects to generate imagery in constrained timeframes where the images might need to convey realistic light interactions, such as light interacting with a participating medium. In some cases, the rendering is needed in real-time, i.e., situations where the geometric model is not available well in advance (such as when the geometric model depends on unpredictable actions taken by a user) and yet the image needs to be generated right then. This places severe strains on computer processing hardware and software.

In real world scenes, moisture or dust in the air often results in visible volumetric shadows and beams of light known as "god rays" or "crepuscular rays." Rendering these light scattering effects in an image of a virtual space is often essential for producing compelling virtual scenes. Simulating all scattering events is prohibitively expensive, especially for real-time applications, and approximations are used instead.

The "single-scattering" model [Blinn1982] greatly simplifies rendering, while still producing realistic effects. In this model, a light ray is modeled as travelling from a source, and may get scattered into the eye at any point in the participating medium, while attenuating along the path. This simplification has allowed participating media with shadows to make its way into modern computer games. Typically, the scattering medium is assumed to be homogeneously distributed through the scene.

The simplest method for rendering single scattering is ray marching. In ray marching, the rendering system calculates pixel values by considering a ray cast from the camera eye through each pixel and approximating a scattering integral by "marching" along that ray and checking if each sample is lit or shadowed using a shadow map. To generate high-quality images, however, many samples are needed. Several methods for accelerating this process have been published in the last couple of years. [Baran2010] shows some examples.

There have been several papers written on solving the single-scattering integral (semi)-analytically [Sun2005; Pegoraro2009; Pegoraro2010], but they necessarily ignore shadowing, which is often required for realism. Other methods, such as volumetric photon mapping [Jensen1998; Jarosz2008] and line space gathering [Sun2010] compute solutions to more difficult scattering problems, such as volumetric caustics or multiple scattering, but even with graphical processing unit ("GPU") acceleration they are far from real-time on complex scenes.

Max [Max1986] described how to compute the single-scattering integral by finding the lit segments on each ray using shadow volumes intersected with epipolar slices. The integral on each lit segment is computed analytically. Epipolar sampling [Engelhardt2010] speeds up ray marching by computing it only at depth discontinuities along image-space epipolar lines. The scattered radiance at all other points is interpolated along these lines, but this can cause temporally-varying artifacts, as discussed in prior work [Baran2010]. Wyman and Ramsey [Wyman2008] use shadow volumes to cull ray marching in unlit areas. Hu et al. [Hu2010] recently presented an algorithm for interactive volumetric caustics, using Wyman and Ramsey's [Wyman2008] method for single scattering. Though this method works well for simple occluders, it becomes slow in the presence of complex visibility boundaries. Several methods [Dobashi2000; Dobashi2002] compute the scattering integral by constructing slices at different depths, rendering the scattering at these slices, and using alpha-blending to combine them. Imagire and colleagues [Imagire2007] use a hybrid approach that incorporates both slices and ray marching.

The algorithm of Billeter et al. [Billiter2010] is similar to that of Max [Max1986], but generates the shadow volume from the shadow map and uses the GPU rasterizer to compute the lit segments. This latter method is exact up to the shadow map resolution. It is very fast for low-resolution shadow maps, but slows down significantly for higher resolution shadow maps (such as $4096^2$ resolution) and the number of vertices in the shadow volume overwhelms the pipeline. Unfortunately, large and complex scenes of interest require such high-resolution shadow maps to avoid aliasing.

For high-resolution shadow maps, Billeter et al. perform online decimation of the shadow volume, but this is expensive and has their outer loop over the shadow volume elements, which can require sending a large number of vertices to a GPU. The algorithm of Baran et al. [Baran2010] (referred to herein as "incremental integration") uses epipolar rectification to reduce scattering integration to partial sums on a rectilinear grid and uses a partial sum tree to accelerate this computation. While this method has good worst-case upper bounds and is very fast on a CPU, it requires an incremental traversal of multiple camera rays in a particular order, making it difficult to utilize the full parallelism provided by a GPU. Implementing their method on a GPU also requires using a GPGPU API, such as CUDA or OpenCL, but that constrains the hardware that can be used for rendering Min-max mipmaps have been used for accelerating soft shadows [Guennebaud2006], global illumination [Nichols2009], as well as ray tracing geometry images [Carr2006] and height fields [Mastin1987; Musgrave1989; Tevs2008], but these are two-dimensional ("2D") mipmaps and are not all that simple and efficient.

Thus, even with those techniques, there was room for improvement.

REFERENCES

[Baran2010] Baran, I., Chen, J., Ragan-Kelley, J., Durand, F., and Lehtinen, J., A hierarchical volumetric shadow algorithm for single scattering, *ACM Transactions on Graphics* 29, 5, to appear, 2010;

[Billiter2010] Billeter, M., Sintorn, E., and Assarsson, U., Real time volumetric shadows using polygonal light volumes, In Proc. *High. Performance Graphics,* 2010;

[Blinn1982] Blinn, J. F., Light reflection functions for simulation of clouds and dusty surfaces, 21-29 (1982);

[Carr2006] Carr, N. A., Hoberock, J., Crane, K., and Hart, J. C., Fast GPU ray tracing of dynamic meshes using geometry images, In *Graphics Interface* 2006, 203-209, 2006;

[Dobashi2000] Dobashi, Y., Yamamoto, T., and Nishita, T., Interactive rendering method for displaying shafts of light, In *Proc. Pacific Graphics*, IEEE Computer Society, Washington, D.C., USA, 31, 2000;

[Dobashi2002] Dobashi, Y., Yamamoto, T., and Nishita, T., Interactive rendering of atmospheric scattering effects using graphics hardware, In Proc. *Graphics hardware*, 99-107, 2002;

[Engelhardt2010] Engelhardt, T., And Dachsbacher, C., Epipolar sampling for shadows and crepuscular rays in participating media with single scattering, In Proc. 2010 *ACM SIGGRAPH symposium on Interactive 3D Graphics and Gaines*, ACM, 119-125, 2010;

[Guennebaud2006] Guennebaud, G., Barthe, L., and Paulin, M., Real time soft shadow mapping by backprojection, In *Eurographics Symposium on Rendering (EGSR), Nicosia, Cyprus*, 26 Jun. 2006-28 Jun. 2006, Eurographics, 227-234, 2006;

[Hu2010] Hu, W., Dong, Z., Ihrke, I., Grosch, T., Yuan, G., and Seidel, H.-P., Interactive volume caustics in single scattering media, In 13*D '10: Proceedings of the 2010 symposium on Interactive 3D graphics and games*, ACM, 109-117, 2010;

[Imagire2007] Imagire, T., Johan, H., Tamura, N., and Nishita, T., Anti-aliased and real-time rendering of scenes with light scattering effects, The Visual Computer 23, 9-11 (September), 935-944, 2007;

[Jarosz2008] Jarosz, W., Zwicker, M., and Jensen, H. W., The beam radiance estimate for volumetric photon mapping, *Computer Graphics Forum*, 27, 2 (April), 557-566, 2008;

[Jensen1998] Jensen, H. W., And Christensen, P. H., Efficient simulation of light transport in scenes with participating media using photon maps, In Proc. *SIGGRAPH* 95, 311-320, 1998;

[Lokovic2000] Lokovic, T., and Veach, E., Deep shadow maps, In *Proceedings of ACM SIGGRAPH* 2000, Computer Graphics Proceedings, Annual Conference Series, 385-392, 2000;

[Mastin1987] Mastin, G. A., Watterberg, P. A., and Mareda, J. F., Fourier synthesis of ocean scenes, *IEEE Computer Graphics & Applications* 7,3 (March), 16-23, 1987;

[Max1986] Max, N. L., Atmospheric illumination and shadows, In *Computer Graphics* (Proc. SIGGRAPH '86), ACM, New York, N.Y., USA, 117-124, 1986;

[Musgrave1989] Musgrave, F. K., Kolb, C. E., and Mace, R. S., The synthesis and rendering of eroded fractal terrains, In *Computer Graphics (Proceedings of SIGGRAPH* 89), 41-50, 1989;

[Nichols2009] Nichols, G., and Wyman, C., Multiresolution splatting for indirect illumination, In *ACM Symposium on Interactive 3D Graphics and Gaines*, ACM, 83-90, 2009;

[Pegoraro2009] Pegoraro, V., and Parker, S., An analytical solution to single scattering in homogeneous participating media, *Computer Graphics Forum*, 28, 2, 2009;

[Pegoraro2010] Pegoraro, V., Schott, M., And Parker, S. G., A closed-form solution to single scattering for general phase functions and light distributions, *Computer Graphics Forum*, 29, 4, 1365-1374, 2010;

[Sun2005] Sun, B., Ramamoorthi, R., Narasimhan, S., and Nayar, S., A practical analytic single scattering model for real time rendering. *ACM Trans. Graph.*, 24, 3, 2005;

[Sun2010] Sun, X., Zhou, K., Lin, S., and Guo, B., Line space gathering for single scattering in large scenes, *ACM Trans. Graph.*, 29, 4, 2010;

[Tevs2008] Tevs, A., Ihrke, I., and Seidel, H.-P., Maximum mipmaps for fast, accurate, and scalable dynamic height field rendering, In *Symposium on Interactive 3D Graphics and Games (i3D '08)*, 183-190, 2008;

[Wyman2008] Wyman, C., And Ramsey, S., Interactive volumetric shadows in participating media with single-scattering, In Proc. *IEEE Symposium on Interactive Ray Tracing*, 87-92, 2008.

SUMMARY

A computer-implemented method for rendering a scene from a geometric model of elements in the scene, lighting and a participating volumetric medium, is provided wherein the volumetric medium and lighting of such volumetric medium and scene is represented by electronically readable representative data, and rendering corresponds to generating pixel values from an image representing a view of the scene from a camera viewpoint, the method comprising at least generating a shadow map representing visibility from a light source in the scene, converting the shadow map using epipolar rectification to form a rectified shadow map (or generating the rectified shadow map directly), generating an approximation to visibility terms in a scattering integral, then for each of a plurality of rows in the rectified shadow map, computing a 1D min-max mipmap or other acceleration data structure that can be used in parallel for multiple camera rays in a single epipolar slice and traversing that mipmap or data structure to find lit segments that are used for accumulating values for the scattering integral for specific camera rays, and generating rendered pixel values that take into account accumulated values for the scattering integral for the plurality of camera rays.

The scattering near an epipole of the rectified shadow map might be done using brute force ray marching when the epipole is on or near a view plane region in the scene corresponding to a screen corresponding to the image being rendered. The process can also include a depth map representing visibility from the camera viewpoint.

In some embodiments, the process is implemented using a graphics processing unit ("GPU") and formulating the process as multiple parallel and independent operations allows for faster rendering, which is useful for interactive and real-time applications.

BRIEF DESCRIPTION OF THE DRAWINGS

FIG. 2 illustrates an example of the acceleration data structure usable in rendering.

FIG. 7 illustrates a process of traversing the min-max mipmap for an example camera ray shown in FIG. 6.

FIG. 8 is pseudocode illustrating a process of traversal of a min-max mipmap.

DETAILED DESCRIPTION

Figure 1:
FIG. 1 illustrates an example scene rendered using techniques described herein.

Embodiments of the present invention are described herein, in many places, as a set of computations. It should be understood that these computations are not performable manually, but are performed by an appropriately programmed computer, computing device, electronic device, or the like, that might be a general purpose computer, a graphical processing unit, and/or other hardware. As with any physical system, there are constraints as to the memory available and the number of calculations that can be done in a given amount of time. Embodiments might be described in mathematical terms, but one of ordinary skill in the art, such as one familiar with computer graphics, would understand that the mathematical steps are to be implemented for execution in some sort of hardware environment. Therefore, it will be assumed that such hardware and/or associated software or instructions are present and the description below will not be burdened with constant mention of same. Embodiments might be implemented entirely in software stored on tangible, non-transitory or transitory media or systems, such that it is electronically readable. While in places, process steps might be described by language such as "we calculate" or "we evaluate" or "we determine", it should be apparent in some contexts herein that such steps are performed by computer hardware and/or defined by computer hardware instructions and not persons.

The essential task of such computer software and/or hardware, in this instance is to generate images from a geometric model or other description of a virtual scene. In such instances, it will be assumed that the model/description includes description of a space, a virtual camera location and virtual camera details, objects and light sources. Also, here we will assume some participating media, i.e., virtual media in the space that light from the virtual light sources passes through and interacts with. Such effects would cause some light from the light source to be deflected from the original path from the light source in some direction, deflected off of some part of the media and toward the camera viewpoint. Of course, there need not be actual light and actual reflection, but it is often desirable that the image be generated with realism, i.e., creating images where the effects appear to behave in a manner similar to how light behaves and interacts with objects in a physical space.

As explained above, simple images are easy to render, but often that is not what is desired. Complex images might include participating media such as fog, clouds, etc.

In many descriptions of image generators, the output image is in the form of a two-dimensional ("2D") array of pixel values and in such cases, the software and/or hardware used to generate those images is referred to as a renderer. There might be image generators that generate other representations of images, so it should be understood that unless otherwise indicated, a renderer outputs images in a suitable form. In some cases, the renderer renders an image or images in part, leaving some other module, component or system to perform additional steps on the image or images to form a completed image or images.

As explained, a renderer takes as its input a geometric model or some representation of the objects, lighting, effects, etc. present in a virtual scene and derives one or more images of that virtual scene from a camera viewpoint. As such, the renderer is expected to have some mechanism for reading in that model or representation in an electronic form, store those inputs in some accessible memory and have computing power to make computations. The renderer will also have memory for storing intermediate variables, program variables, as well as storage for data structures related to lighting and the like, as well as storage for intermediate images. Thus, it should be understood that when the renderer is described, for example, as having generated multiple intermediate images and averaging them, it should be understood that the corresponding computational operations are performed, e.g., a processor reads values if pixels of the intermediate images, averages pixels and stores a result as another intermediate image, an accumulation image, or the final image, etc. The renderer might also include or have access to a random number generator.

In approaches described below, an acceleration data structure is used to greatly speed up the rendering process when camera rays can be processed in parallel, and in other situations. It may be that, for some considerations, the rays are not processed in parallel, but they could be if desired. This parallelizability is provided, in part, by the use of an acceleration data structure that doesn't require updates from camera ray to camera ray such that the camera rays must be processed serially and the processing for a given camera ray might have to wait until a data structure is updated with the results from another camera ray's processing.

The acceleration data structure encodes, among other things, for a shadow map. A shadow map is an indication of where, in the virtual space being rendered, light from a light source can be seen and cannot be seen. In approaches described herein, we show how a renderer can apply a simple acceleration data structure to intersect camera rays with the shadow map. The acceleration data structure might be organized as a 1D bounding volume hierarchy, 1D min-max mipmaps or similar structures, such that for a given epipolar slice of the shadow map rectified into a row of the rectified shadow map multiple camera rays could be processed in parallel (rows and columns can be reversed by rotating or transposing a 2D array of values, so rows are used in these examples without loss of generality).

Multiple camera rays can be processed in parallel using the acceleration data structure in that it is a static acceleration data structure, i.e., using it to process one camera ray will not alter the acceleration data structure so that it can be used for processing a second camera ray without requiring the completion, or even the start, of the processing for the other camera ray. There might be one 1D height field, 1D min-max mipmap or similar structure for each epipolar slice, thus forming an array of 1D mipmaps. The regions of the image near the epipole, if the epipole falls on the image, might be specially handled, perhaps by brute force processing, such as ray marching.

FIG. 1 illustrates an example scene rendered using techniques described herein. In the example of FIG. 1, the scene was renderable in real-time (55 frames per second). As can be seen, light from a light source (outside the building) comes through the windows and illuminates surfaces, but also illuminates the participating medium (the air inside the building) and this effect is seen from the camera eye view. Without the processing of light rays interacting with the medium, the room would appear to have no air or extremely clear air. Instead, in this scene, it is a much different effect to have light interacting with the medium. Often the resulting visible volumetric shadows and beams of light are referred to as "god rays" or "crepuscular rays." Rendering these light scattering effects is often essential for producing compelling virtual scenes. In many examples herein, homogeneously of the medium distributed through the scene is assumed, but the heterogeneous case might be dealt with as well, as explained below.

As explained in more detail below, the renderer can use epipolar rectification of the shadow map to transform the 2D height field into a collection of independent 1D height fields, one for each epipolar slice. This simplifies parallelism. In some embodiments, the renderer uses singular value decomposition to approximate the smoothly varying terms of the scattering integral, avoiding an analytical solution and supporting textured lights.

Figure 2A:
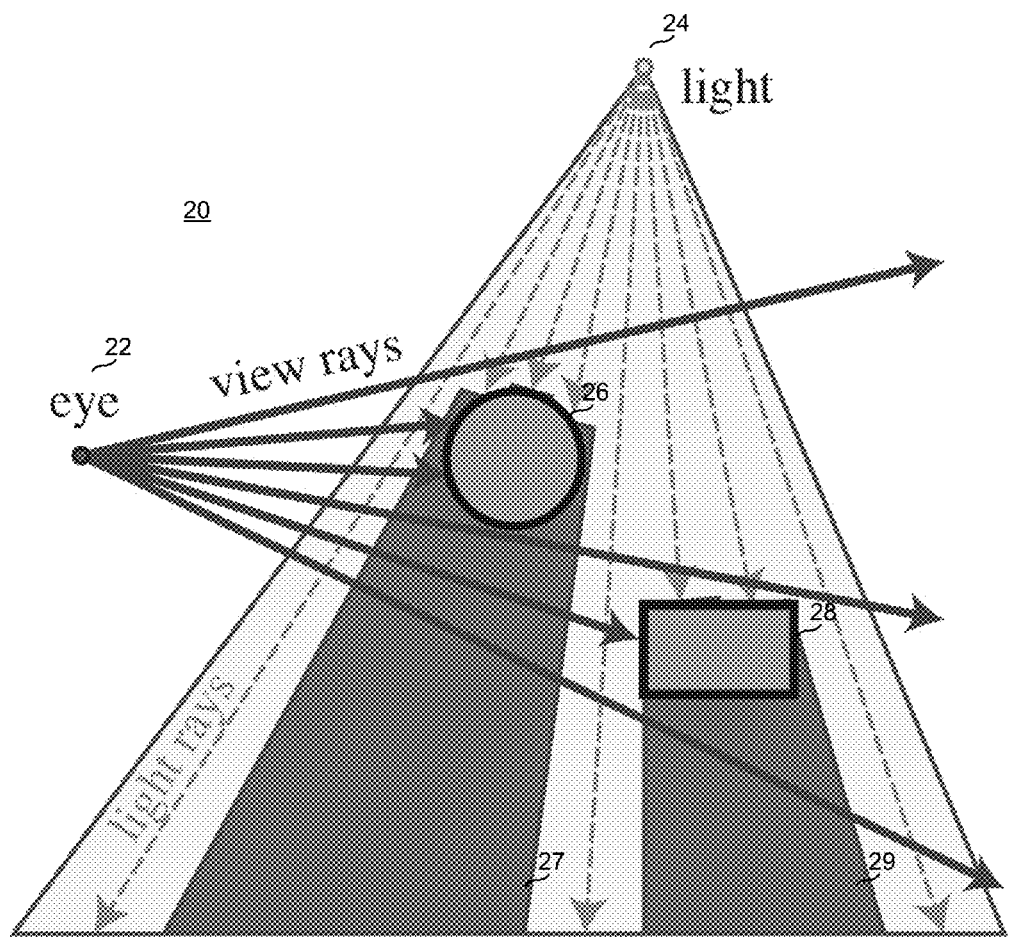
FIG. 2A illustrates a shadow map in a scene and FIG. 2B illustrates a corresponding rectified shadow map, and a corresponding 1D min-max mipmap.
Figure 2B:
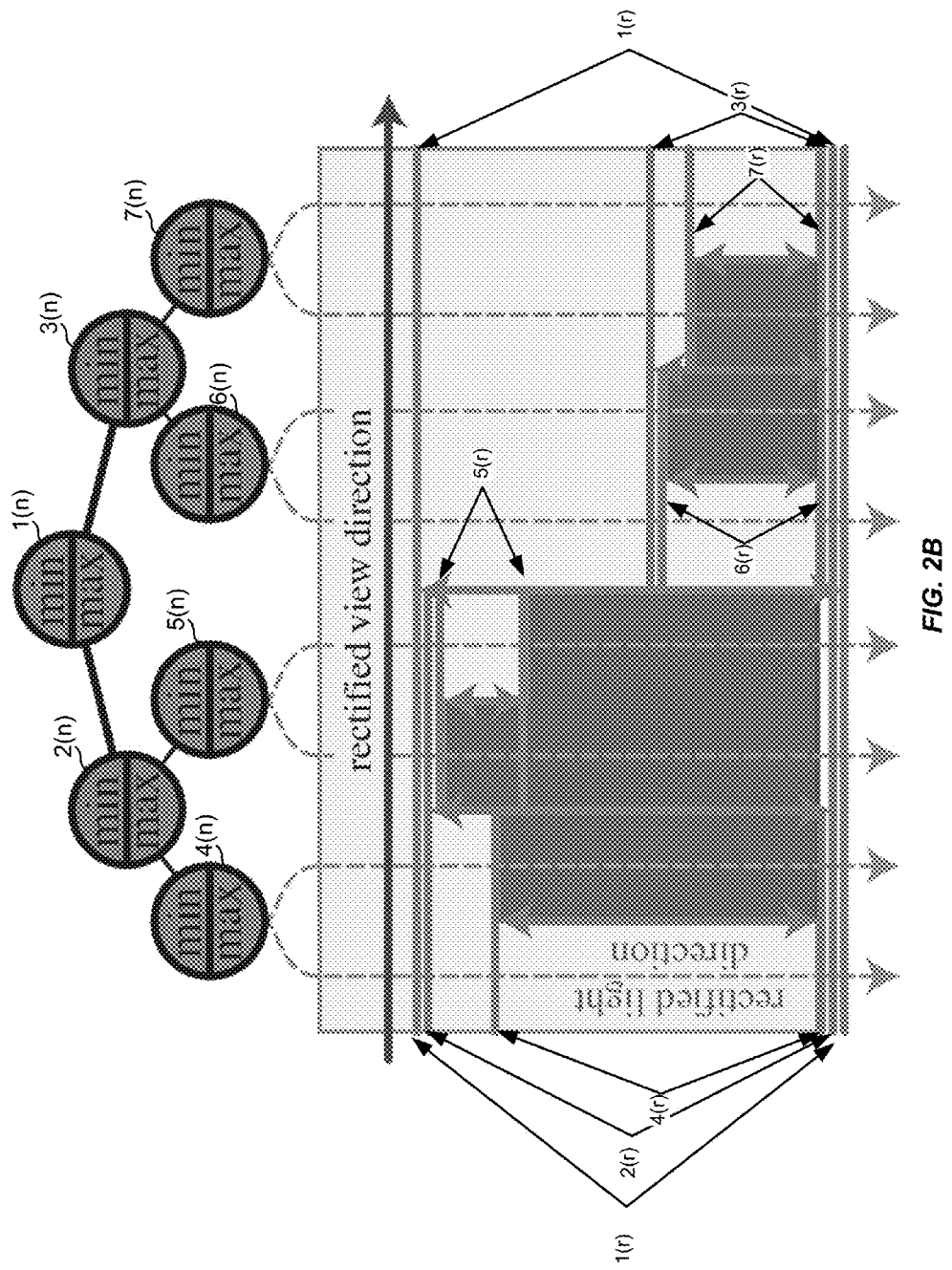

FIG. 2 illustrates an example of the acceleration data structure. To compute single scattering in scenes with occluders, a depth image from the camera is generated and a shadow map from the light is generated. After epipolar rectification of the shadow map (rectification of the depth map is not needed, as explained herein), each row of the shadow map is a 1D height field. The renderer optimizes the computation of the scattering integral by using an efficient data structure (such as the 1D min-max mipmap illustrated in FIG. 2B) over this height field. This data structure helps compute the scattering integral for all camera rays in parallel. Our method can render complex high-quality scenes with textured lights in real-time (55 FPS).

As shown in FIG. 2, FIG. 2A illustrates a scene 20 with a camera/eye viewpoint 22 and a point light source 24. The objects 26, 28 in the scene block the light and thus create shadows. An approximation to these shadows is represented by the shadow map having shadow portions 27, 29. By reorganizing the shadow map into a 1D min-max mipmap, or similar structure, as illustrated in FIG. 2B, the light rays then correspond to columns in the acceleration data structure and camera rays then correspond to rows in the acceleration data structure. In FIG. 2B, the horizontal arrow represents a camera ray, whereas the horizontal lines represent the various minimum and maximum boundaries for depth maps for various nodes of the binary tree. In the figure, the nodes are referenced by the numbers 1 through 7 and a parenthetical (n) and the corresponding min/max ranges are referenced by the corresponding number with a parenthetical (r).

As explained herein, then a method of finding all the lit segments for all pixels in the image can be done in parallel. Unlike Billeter et al., the renderer can compute the lit segments with an outer loop over pixels, so a large number of vertices do not need to be sent to the GPU and can also support textured lights, and possibly be combined with epipolar sampling for further acceleration.

Incremental integration uses epipolar rectification to reduce scattering integration to partial sums on a rectilinear grid and uses a partial sum tree to accelerate this computation. While this method has good worst-case upper bounds and is very fast on the CPU, it requires an incremental traversal of multiple camera rays in a particular order, making it difficult to utilize the full parallelism provided by a GPU. In contrast, some of the approaches described herein may sacrifice worst-case guarantees, but allow all camera rays to be processed in parallel using only features found in simple pixel shaders. We also do not require camera rectification, avoiding the need to process twice as many camera rays as pixels (due to the non-uniform sampling in polar coordinates) and reducing aliasing. Because of rectification, only 1D min-max mipmaps are needed, whose traversal is simple and efficient, even where all intersections between the height field and the ray are needed, not only the first.

Overview

Light scattering in a participating medium is responsible for several important effects we see in the natural world. In the presence of occluders, computing single scattering requires integrating the illumination scattered towards the eye along the camera ray, modulated by the visibility towards the light at each point. Unfortunately, incorporating volumetric shadows into this integral, while maintaining real-time performance, remains challenging.

Herein, methods and apparatus are described that may allow for real-time computing of volumetric shadows in single-scattering media on a graphics processing unit ("GPU"). A method evaluates the scattering integral over the intersections of camera rays with a shadow map, expressed as a 2D height field. By applying epipolar rectification to the shadow map, each camera ray only travels through a single row of the rectified shadow map (an epipolar slice), which allows a renderer to find the visible segments by considering only 1D height fields. An acceleration structure (a 1D min-max mipmap, for example) is used to allow for quickly finding the lit segments for all pixels in an epipolar slice in parallel. The simplicity of this data structure and its traversal allows for efficient implementation using only pixel shaders on the GPU, if needed.

At a high level, a renderer performs the following steps to render each frame (some of the results might be reused for later frames):

1. Render a depth map from the camera and a shadow map from the light.
2. Perform epipolar rectification on the shadow map (detailed below).
3. Compute a low-rank approximation to all but the visibility terms in the scattering integral (detailed below).
4. For each row of the rectified shadow map, compute a 1D min-max mipmap (detailed below).
5. For each camera ray, traverse the min-max mipmap to find lit segments and accumulate the scattering integral.
6. If the epipole is on or near the screen, compute the scattering near the epipole using brute force ray marching.

In this process, a static min-max mipmap can be used instead of a dynamic data structure such as a partial sum tree used for integration, which is simpler, allows all rays to be processed in parallel, and avoids the need for camera rectification.

Single Scattering Formulation

In the single-scattering model, the radiance scattered toward the eye is integrated along each camera ray, up to the first surface. At every point on this ray, if the light source is visible from that point, a certain fraction of that light gets scattered towards the eye. Light also gets attenuated as it travels from the light source to the scattering point and to the eye. This leads to Equation 1 for the radiance, L(v), scattered towards the eye (assumed to be the origin of the coordinate system used for these equations) over a camera ray whose direction is v, where d is the distance to the first occluder along the ray, $\sigma_s$ is the scattering coefficient, $\sigma_t = \sigma_s + \sigma_a$ is the extinction coefficient, V(sv)=1 when the point sv can see the light and V(sv)=0 if it is in shadow, $L_{in}(sv)$ is the radiance incident to point sv assuming no occlusion, and $\rho(\theta)$ is the scattering phase function, with $\theta$ being the angle between v and the light direction.

$$L(v) = \int_o^d e^{-\sigma_t s} V(sv) \sigma_s \rho(\Theta) L_{in}(sv) ds, \quad (\text{Eqn. 1})$$

For the simplest case of a uniform directional light source with no extinction along light rays, $L_{in}(sv)$ is a constant. For an isotropic point light source at x, Equation 2 holds, where I is the light intensity. For a textured light source, the intensity I is a function of sv projected to light coordinates.

$$L_{in}(sv) = \frac{Ie^{-\sigma,d}(sv)}{d(sv)^2}, d(sv) = \|x - sv\|$$ (Eqn. 2)

Rectification and Low-Rank Approximation

Epipolar rectification is an assignment of coordinates ($\alpha$, $\beta$, $\gamma$) to every world space point p such that camera rays are indexed by ($\alpha$, $\beta$) and light rays are indexed by ($\alpha$, $\gamma$). The world space is partitioned into epipolar slices, planes that contain the eye and that are parallel to the light direction, and the $\alpha$ coordinate specifies p's slice. The coordinate $\beta$ specifies the view ray within the slice. For directional lights, this is the angle to the light direction, and for point lights this is the angle between the view ray and the direction from the eye to the light source. The $\gamma$ coordinate specifies the light ray within the slice, measured as the distance to the eye for a directional light source or the angle to the eye for a point light source.

Figure 3A:
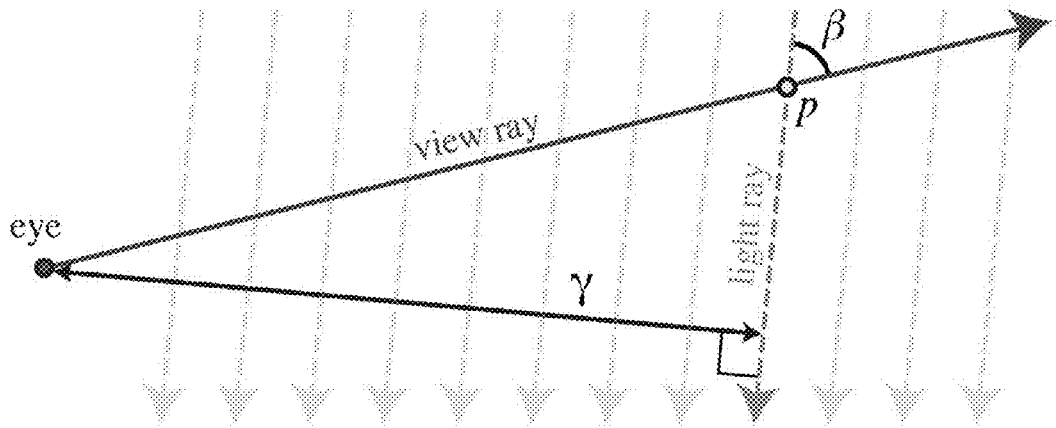
FIG. 3 illustrates an example epipolar coordinate system for a directional light (FIG. 3A) and a point light (FIG. 3B).
Figure 3B:
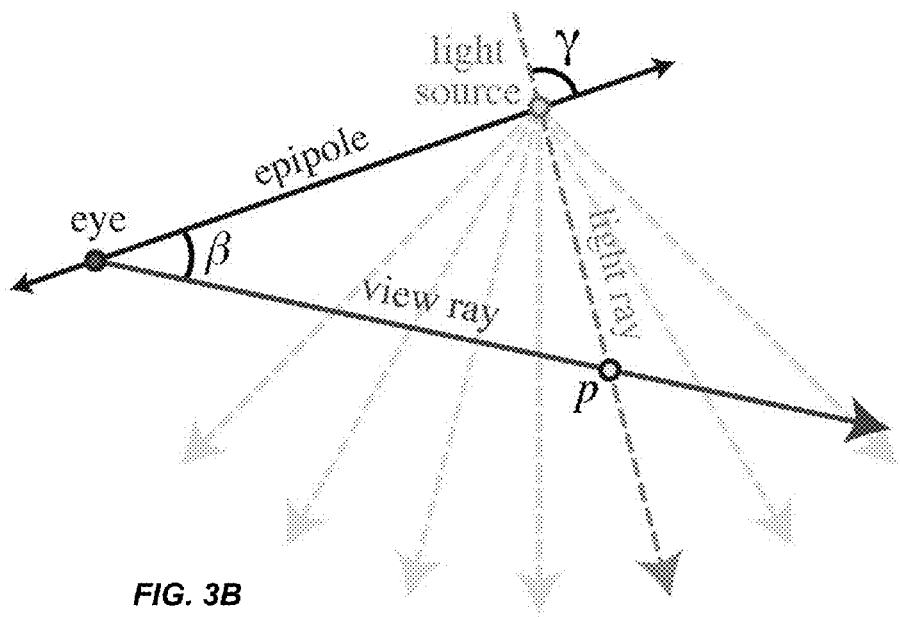

This is illustrated in FIG. 3, showing an example epipolar coordinate system for a directional light (FIG. 3A) and a point light (FIG. 3B) and epipolar coordinates within an epipolar slice for each. The $\alpha$ coordinate determines the epipolar slice. Each pixel of the shadow map corresponds to a point in world space.

Figure 4:
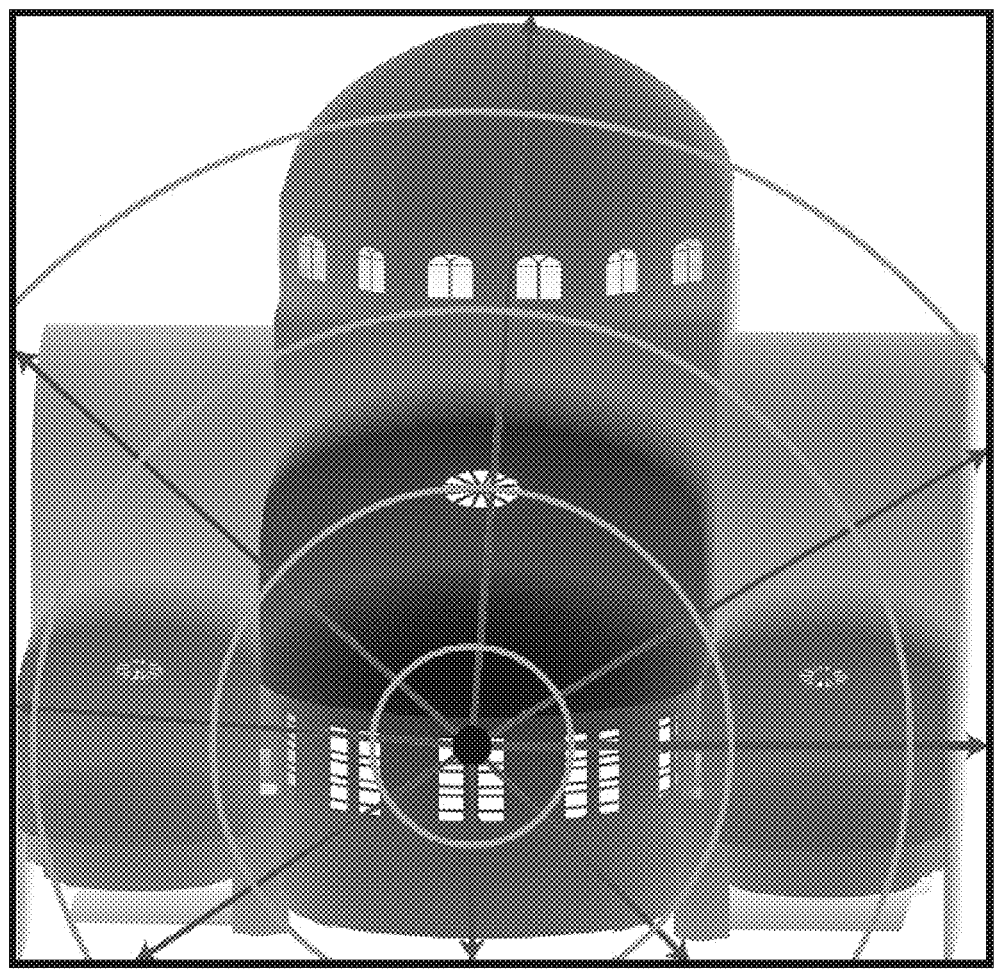
FIG. 4 illustrates an example shadow map with an epipolar coordinate system overlaid thereon.
Figure 5:
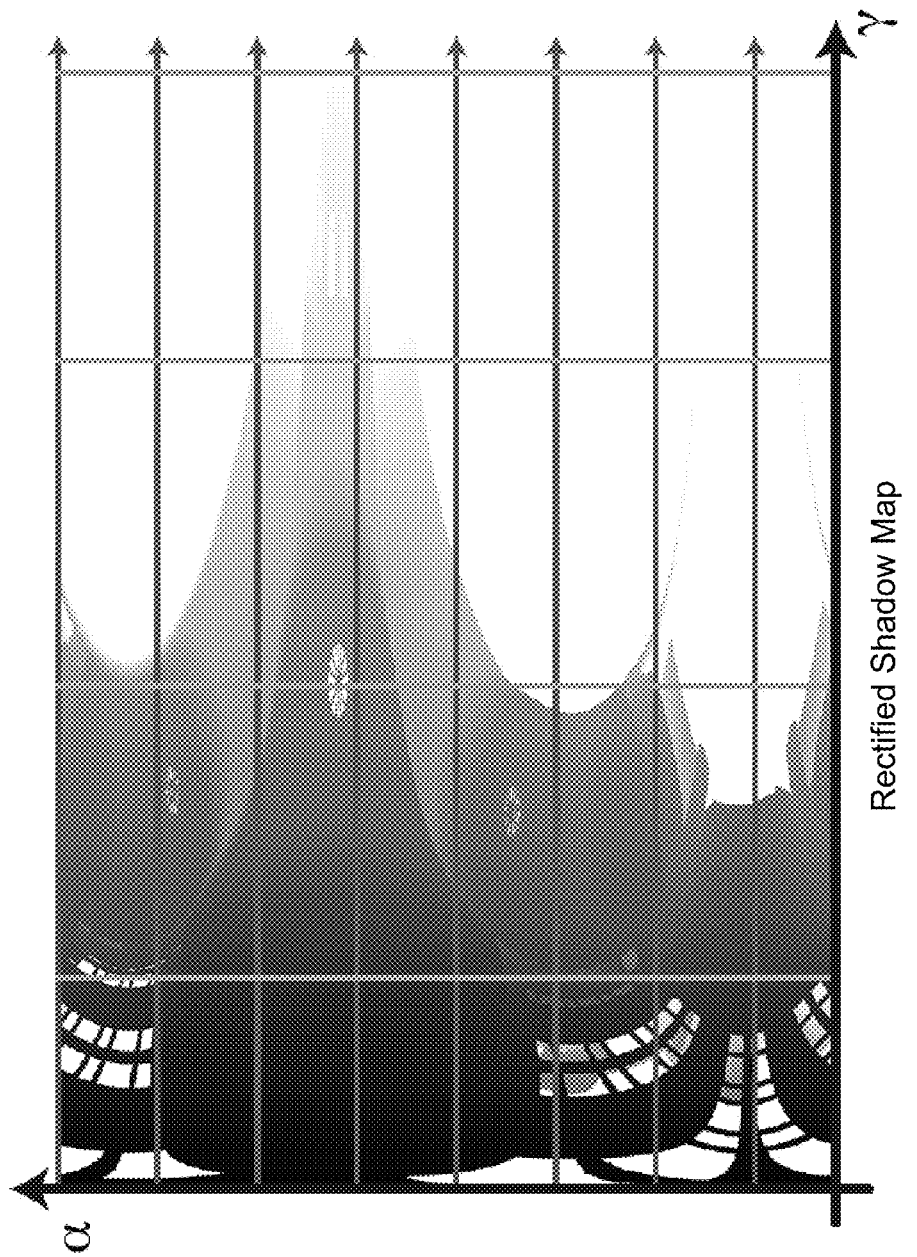
FIG. 5 illustrates an example rectified shadow map corresponding to the shadow map of FIG. 4.

FIG. 4 illustrates an example shadow map with an epipolar coordinate system overlaid thereon. FIG. 5 illustrates an example rectified shadow map corresponding to the shadow map of FIG. 4. This turns epipolar slices (radial lines emanating from the epipole shown in FIG. 4) into rows of the rectified shadow map shown in FIG. 5. For directional light, the radial distance from the epipole is the coordinate $\gamma$, which specifies a column within each slice. The value of each pixel in the rectified shadow map gives the $\beta$ coordinate of the occluder. In the rectified shadow map, rows are indexed by $\alpha$, columns by $\gamma$, and the element stored at ($\alpha$, $\gamma$) is the $\beta$ coordinate of the camera ray at which that light ray terminates. Because camera rays can be processed in any particular order, rectification of the camera depth map is not needed.

Using a change of variables, the scattering integral (Equation 1) of an untextured light may be written in epipolar coordinates as shown by Equation 3, where D($\alpha$, $\beta$) is the $\gamma$ coordinate of the light ray at which the camera ray ($\alpha$, $\beta$) is blocked.

$$L(\alpha, \beta) = \int_o^{D(\alpha,\beta)} e^{-\sigma_s s(\beta,\gamma)} V(\alpha, \beta, \gamma) \sigma_s \rho(\beta, \gamma) L_{in}(\beta, \gamma) \frac{ds}{d\gamma} d\gamma$$ (Eqn. 3)

Except for the visibility component, the integrand only depends on $\beta$ and $\gamma$, not $\alpha$. Thus, the scattering integral can be simplified as shown in Equation 4, where I has all of the other terms baked in.

$$L(\alpha,\beta) = \int_o^{D(\alpha,\beta)} V(\alpha,\beta,\gamma) I(\beta,\gamma) d\gamma$$ (Eqn. 4)

The values for the integral of I($\beta$, $\gamma$) can be precomputed, but that would require approximating the integral once for each $\beta$, which would be expensive. Instead, the renderer can compute this taking into account that all terms of I vary smoothly and thus approximates I($\beta$, $\gamma$) as $\Sigma_i^N B_i(\beta)\Gamma_i(\gamma)$ for a small N. The renderer can compute this approximation by sampling I in a 64-by-64 grid, take the SVD (on the CPU, as this does not need to be done more than once per frame), and using the singular vectors associated with the top N singular values. In one embodiment, N=4, but other values of N can be used. This results in Equation 5.

$$L(\alpha, \beta) \approx \sum_i^N \left( B_i(\beta) \int_O^{D(\alpha,\beta)} V(\alpha, \beta, \gamma)\Gamma_i(\gamma) d\gamma \right)$$ (Eqn. 5)

Approximating the integral as a Riemann sum, and using the structure of the visibility function results in Equation 6, where S[$\alpha$, $\gamma$] is the rectified shadow map. Using this process, the rendered can render by only having to compute N prefix sum tables instead of one for each $\beta$.

$$L(\alpha, \beta) \approx \sum_i^N \left( B_i(\beta) \sum_{\substack{\gamma<D(\alpha,\beta)\\S[\alpha,\gamma]>\beta}} \Gamma_i(\gamma)\Delta\gamma \right)$$ (Eqn. 6)

Min-Max Mipmap Construction and Traversal

Note how the actual integral, i.e., the inner sum of Equation 6 is evaluated.

Incremental integration uses interdependence between camera rays within a slice, maintaining $\Sigma_\gamma V(\beta, \gamma)\Gamma_i(\gamma)\Delta\gamma$ in a partial sum tree for each slice. In contrast, the renderer here can process each camera ray independently, which enables massive parallelism. For each ray, the renderer determined the segments ($\gamma_-$, $\gamma_+$) for which S[$\alpha$, $\gamma$]>$\beta$, i.e., the lit regions of that camera ray. It can then use a table of prefix sums of f, to compute the integral over the segments. The use of a 1D min-max mipmap or similar data structure to accelerate finding the lit segments greatly improves the speed.

Figure 6:
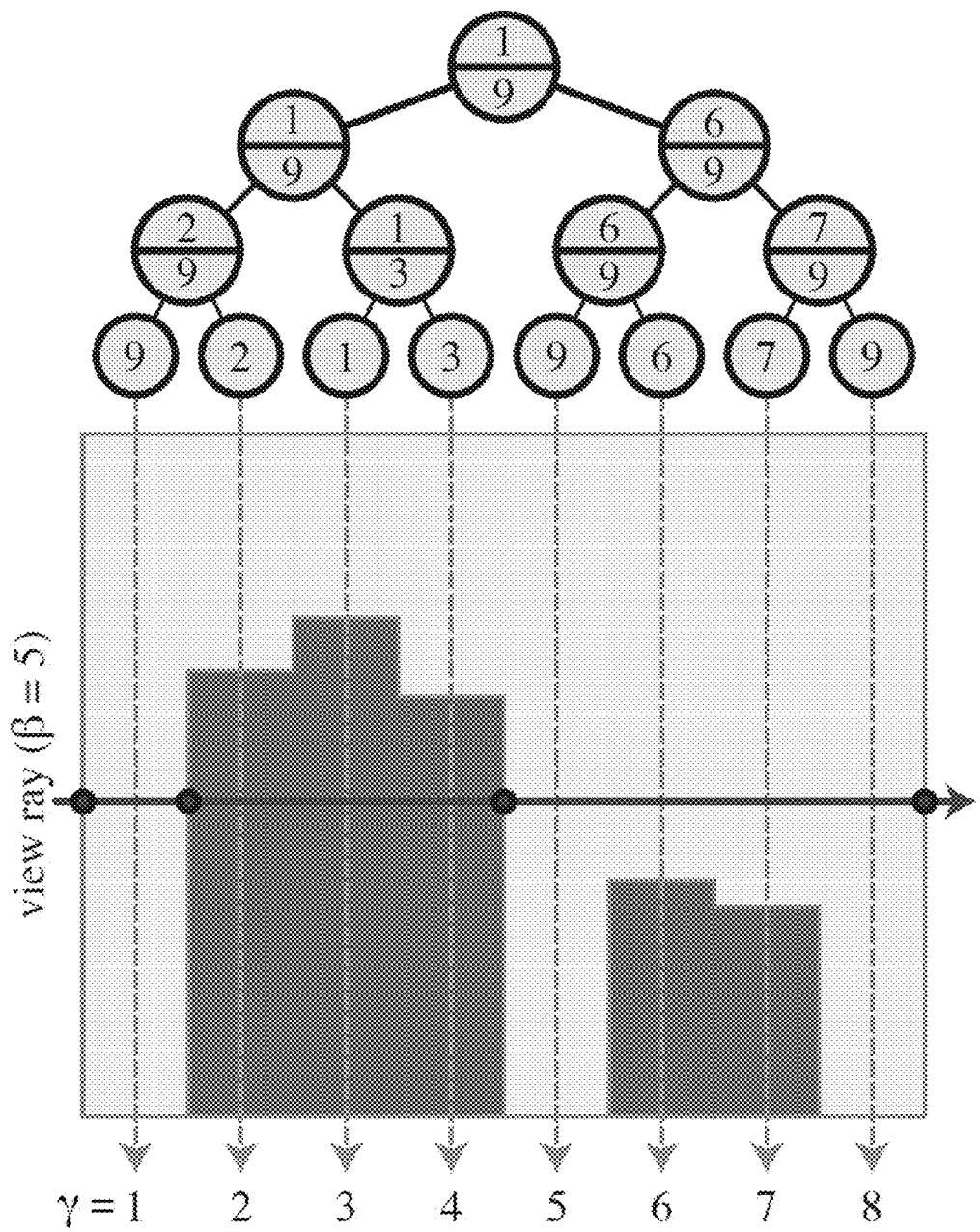
FIG. 6 illustrates a min-max mipmap in specific detail and an example camera ray. This corresponds to the shadow map of FIG. 2B, with the min and max values for nodes provided with each node.

FIG. 6 illustrates a min-max mipmap in specific detail and an example camera ray. This corresponds to the shadow map of FIG. 2B, with the min and max values for nodes provided with each node. Each row of the rectified shadow map, S, represents a 1D height field in an epipolar slice and the renderer can quickly find the intersection of that height field with a camera ray as illustrated. The acceleration data structure might include a complete binary tree on each row with every node of this tree storing the minimum and maximum values of S below that node. These trees can be calculated from ($\log_2$ d) ping-pong passes, each of which computes a level from the level below, where d is the number of light rays, i.e., the resolution of $\gamma$. The two buffers are then coalesced into a single one with each row laid out level by level (perhaps using Ahnentafel indexing), starting with the root at index 1.

FIG. 7 illustrates a process of traversing the min-max mipmap for an example camera ray shown in FIG. 6. To compute the scattering integral for any view ray in this epipolar slice, the renderer traverses the tree by thresholding the min-max mipmap with the $\beta$ value of the view (camera) ray, illustrated by the path. In FIG. 7, nodes entirely in shadow are colored black, nodes entirely lit are colored white, and nodes containing visibility boundaries are grey. After the tree is constructed, for each camera ray, the renderer can traverse it using a recursive process.

Traversal can be implemented in a pixel shader without recursion. FIG. 8 provides an example process for this, in the form of pseudocode. By the time this function is called, min[node, $\alpha$] and max[node, $\alpha$] contain the min-max mipmap, and $\Gamma_{sum}$ stores the prefix-sums of $\Gamma$. The function RANGE returns the range of $\gamma$ coordinates that are below the given tree node.

Given a camera ray at "height" $\beta$, and starting from the root of the tree, each tree node can be processed in turn. If $\beta$ is less than the minimum for a node, that node is completely lit and the integral over the range of that node is accumulated for that camera ray to the output. If β is greater than the maximum, the node is completely shadowed and can be skipped. Otherwise, the renderer recursively processes the two child nodes. To avoid the recursion, when a node is processed, instead of popping the call stack, the renderer can move to the next node, which is either the node at the next index location or its ancestor that is a right child. Thus the path followed in FIG. 7.

Textured Lights

To simulate an effect like stained-glass windows, it is useful to treat the light as having a texture. A light texture map can be rectified, using some of the same techniques as used for rectifying a shadow map. One result of rectification is a texture term for various values of α and γ, represented here as $T(\alpha, \gamma)$. The texture term $T(\alpha, \gamma)$ gets multiplied into the integrand. Because $T(\alpha, \gamma)$ need not be smoothly varying, perhaps it is not baked into I, instead leaving it as a separate term. Equation 6 then becomes Equation 7.

$$L(\alpha, \gamma) \approx \sum_i^N \left( B_i(\beta) \sum_{\substack{y < D(\alpha,\beta) \\ S[\alpha,y] > \beta}} \Gamma_i(\gamma) T(\alpha, \gamma) \Delta \gamma \right)$$ (Eqn. 7)

Note that a similar change could be made to some of the other equations, such as Equation 3 or Equation 4 if the approximation of I is not used.

Instead of precomputing prefix sums of $\Gamma_i(\gamma)$, the renderer precomputes prefix sums of $\Gamma_i(\gamma)T(\alpha, \gamma)$, which is more work because it needs to be done per α. Nonetheless, it is still feasible and can be done in $O(\log_2 t)$ ping-pong passes, where t is the γ-resolution of the rectified light texture.

Example Implementations

An example renderer implementation might operate as described above, using software and/or hardware. Minor optimizations might be provided over the method presented above. For example, to avoid a potentially expensive while loop in the shader for going up the tree, the renderer could go up at most one level in its traversal, which would correspond (in FIG. 8) to replacing the while on line 14 with an if.

The integral over a single lit segment of a ray can be computed using multiple tree nodes. To avoid adding and subtracting $\Gamma_{sum}$ terms that just cancel out, the renderer can delay a update to the integral (line 11 in the pseudocode of FIG. 8) until the next unlit tree node is encountered or the end of the traversal. This optimization is especially useful for colored textured light sources because the renderer might need to access 24 floats (three color channels by four singular vectors for the start and end) instead of eight.

In tests using textured light sources, a light texture whose resolution is lower than the shadow map (512×512 in examples) was used. To achieve good performance, the renderer might do both the rectification and the prefix sum computation at the lower resolution and access the resulting texture (line 11 of FIG. 8) using hardware linear interpolation. The error this introduces is not noticeable.

Results and Evaluation

In one implementation, the renderer uses only those features in DirectX 9. Tests were done on an Intel Core i7™ 960 (3.2 GHz) with an NVIDIA™ GeForce™ 480 GTX GPU at 1280×960 resolution. Four scenes were used for the tests: a church scene (SIBENIK), a church with a textured light (SIBENIKTEX), a forest scene (TREES), and an open mountain scene (TERRAIN). The number of epipolar slices used and incremental integration was scene-dependent, sufficient to guarantee that each camera ray is within half a pixel of a slice. In the test, an isotropic phase function $\rho=\pi/4$ was used.

Table 1 shows how long various stages of the method take for those scenes with a 4K×4K shadow map. Table 1 shows a breakdown of the timing of the method among various stages for a single frame, as well as the timing of incremental integration (Baran et al. method) and brute force ray marching at equal quality. The total times are for scattering only and do not include the time for rendering the shadow map, the camera depth map, and direct lighting, as these operations are part of the standard pipeline and present for all of the methods. When comparing to incremental integration, the roughly 10 ms CUDA/Direct3D interop overhead is omitted. The shadow map resolution is 4096×4096. All times are in milliseconds.

TABLE 1

| | Tested Method | | | | | | | | |
|---|---|---|---|---|---|---|---|---|---|
| Scene | Shadow Map & Direct Lighting | Shadow Map Rectification | Light Texture Precomputation | Mipmap Construction | Integration | Brute Force near Epipole | Total Scattering | Total Scattering (Baran) | Total Scattering (Brute Force) |
| Sibenik | 3.6 | 1.3 | — | 2.5 | 6.8 | 0.3 | 11 | 31 (2.8×) | 113 (10×) |
| Sibeniktex | 3.7 | 1.4 | 1.2 | 2.5 | 12.2 | 0.3 | 18 | — | 144 (8×) |
| Trees | 7.3 | 1.3 | — | 2.6 | 19.8 | — | 24 | 43 (1.8×) | 286 (12×) |
| Terrain | 11.2 | 1.4 | — | 2.5 | 2.6 | — | 7 | 29 (4.1×) | 43 (6×) |

The comparison process is courtesy of Markus Billeter and colleagues. That process was slightly sped up (roughly by 10%) by using a triangle strip instead of individual triangles to render the light volume. However, this implementation does not support directional lights and to compare with that method, the test was with a far-away spotlight in the test scenes.

Table 2 shows performance relative to that of Billeter et al. as the shadow map resolution varies from 1K to 4K. The method described herein is faster (except at 1K shadow-map resolution on TERRAIN) and scales better to high-resolution shadow maps. Note that for complex scenes, even a 2K shadow map resolution is insufficient and can lead to temporal aliasing.

Computing time for scattering is compared between the tested method and the method of Billeter et al. [Billiter2010] on versions of test scenes with a spotlight instead of a directional light. The timings for each scene are for three shadow map resolutions and are given in milliseconds. For the terrain scene at 4K resolution, the adaptive version of Billeter et al.'s method was used because it was 1.8 ms faster than the non-adaptive version.

TABLE 2

|  | Sibenik | | | Trees | | | Terrain | | |
| --- | --- | --- | --- | --- | --- | --- | --- | --- | --- |
|  | 1K | 2K | 4K | 1K | 2K | 4K | 1K | 2K | 4K |
| Tested method | 5.6 | 8.6 | 12.5 | 19.2 | 27.2 | 38.2 | 5.3 | 6.7 | 9.0 |
| [Billeter et al. 2010] | 7.2 | 11.4 | 26.0 | 37.2 | 59.4 | 93.2 | 3.7 | 9.2 | 28.1 |
| Speedup | 1.3× | 1.3× | 2.1× | 1.9× | 2.2× | 2.4× | 0.7× | 1.4× | 3.1× |

Complexity Comparison

It is instructive to understand the number of operations the described methods perform, compared to other approaches.

Let s be the number of slices, p be the number of pixels, and d be the number of depth samples (the resolution of the $\gamma$ variable, equal to the shadow map resolution in our experiments). Let l be the number of contiguous lit segments—so for a scene with no objects, l=p, and for a scene like TREES, l>>p. Let l' be the number of contiguous lit segments up to the first blocker (i.e., whose integral is actually relevant)—sop p≤l'≤l.

Using methods described herein, there are O(l' log d) operations performed, of which precisely 2l' are accesses to Γ. The method of Billeter et al. [Billiter2010] performs Θ(l) operations, of which 2l are computations of the analytic scattering model. They avoid the (log d) tree overhead, but have to process segments that do not contribute to the scattering integral to avoid z-fighting when rendering the light volume. Having to process invisible segments and large numbers of polygons for high-resolution shadow maps offsets their advantage from not having to use trees to find light-shadow transitions. For incremental integration, the complexity is Θ((p+sd) log d), but while p+sd is almost always much smaller than l', that method has a large working set and relatively poor parallelism. This makes incremental integration slower on the GPU even on scenes with very large l', like TREES.

Hardware Example

Figure 9:
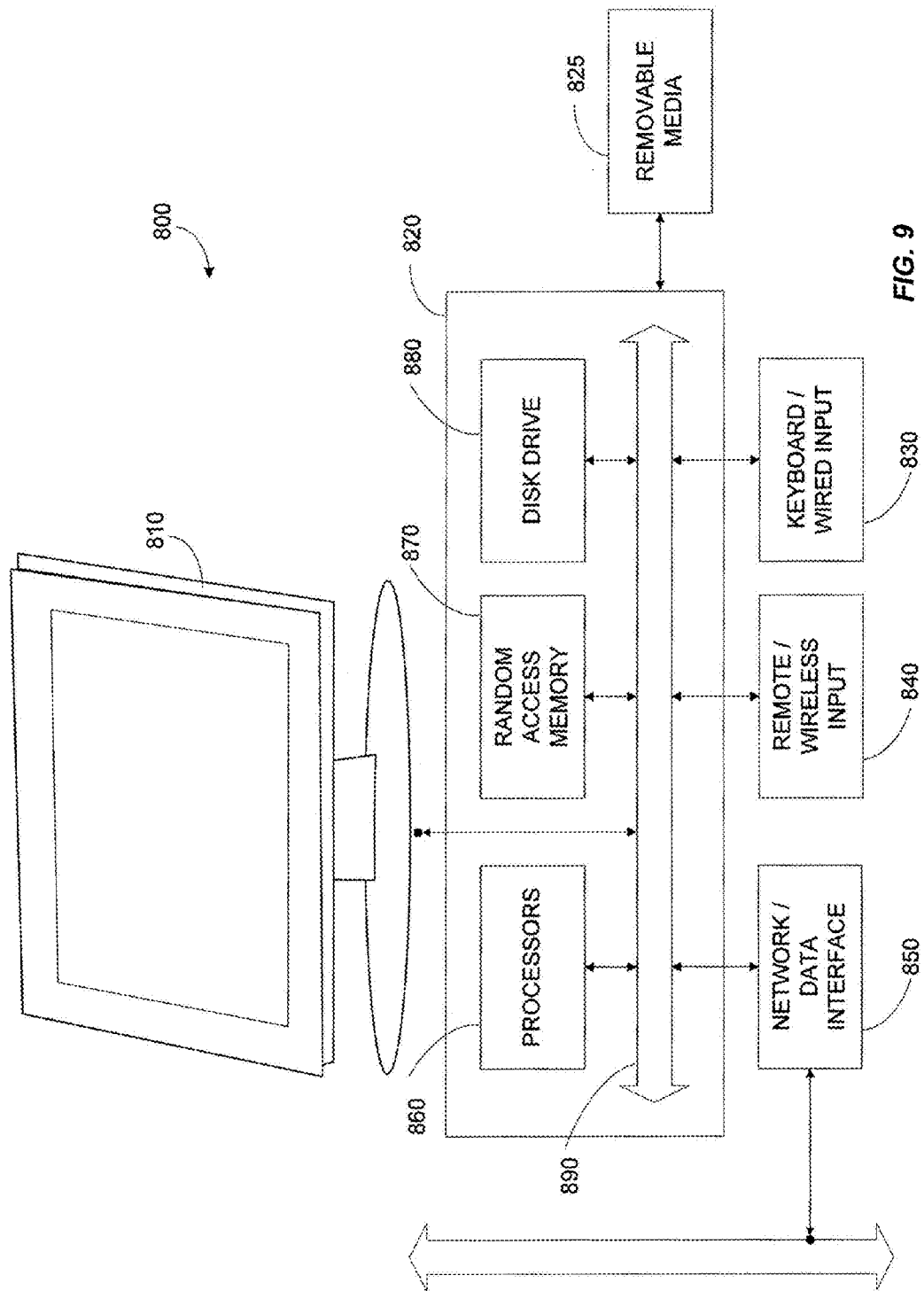
FIG. 9 is a block diagram of example hardware used to implement an embodiment of a renderer according aspects of the present invention.

FIG. 9 is a block diagram of hardware that might be used to implement a renderer. The renderer can use a dedicated computer system that only renders, but might also be part of a computer system that performs other actions, such as executing a real-time game or other experience with rendering images being one part of the operation.

Rendering system 800 is illustrated including a processing unit 820 coupled to one or more display devices 810, which might be used to display the intermediate images or accumulated images or final images, as well as allow for interactive specification of scene elements and/or rendering parameters. A variety of user input devices, 830 and 840, may be provided as inputs. In one embodiment, a data interface 850 may also be provided.

In various embodiments, user input device 830 includes wired connections such as a computer-type keyboard, a computer mouse, a trackball, a track pad, a joystick, drawing tablet, microphone, and the like; and user input device 840 includes wireless connections such as wireless remote controls, wireless keyboards, wireless mice, and the like. In the various embodiments, user input devices 830-840 typically allow a user to select objects, icons, text and the like that graphically appear on a display device (e.g., 810) via a command such as a click of a button or the like. Other embodiments of user input devices include front-panel buttons on processing unit 820.

Embodiments of data interfaces 850 typically include an Ethernet card, a modem (telephone, satellite, cable, ISDN), (asynchronous) digital subscriber line (DSL) unit, FireWire interface, USB interface, and the like. In various embodiments, data interfaces 850 may be coupled to a computer network, to a FireWire bus, a satellite cable connection, an optical cable, a wired-cable connection, or the like.

Processing unit 820 might include one or more CPU and one or more GPU. In various embodiments, processing unit 820 may include familiar computer-type components such as a processor 860, and memory storage devices, such as a random access memory (RAM) 870, disk drives 880, and system bus 890 interconnecting the above components. The CPU(s) and or GPU(s) can execute instructions representative of process steps described herein.

RAM 870 and hard-disk drive 880 are examples of tangible media configured to store data such as images, scene data, instructions and the like. Other types of tangible media includes removable hard disks, optical storage media such as CD-ROMS, DVD-ROMS, and bar codes, semiconductor memories such as flash memories, read-only-memories (ROMS), battery-backed volatile memories, networked storage devices, and the like (825).

FIG. 9 is representative of a processing unit 820 capable of rendering or otherwise generating images. It will be readily apparent to one of ordinary skill in the art that many other hardware and software configurations are suitable for use with embodiments of the present invention described herein. For example, processing unit 820 may be a personal computer, handheld computer, server farm, or similar hardware. In still other embodiments, the techniques described below may be implemented upon a chip or an auxiliary processing board.

Additional Variations

Like several other methods for speeding up volumetric shadows, a homogeneous isotropic medium is assumed. The isotropy assumption allows for computing the SVD only once per frame. For an anisotropic medium, I becomes a function of $\alpha$. It is a smooth function of $\alpha$, so a renderer might compute the SVD at a few values of a and interpolate between the results. A similar method may work for a very smoothly varying nonhomogeneous medium. Note that an anisotropic medium is not the same thing as an anisotropic phase function, which is only a function of $\beta$ and $\gamma$ and which simpler methods herein may support.

Reducing aliasing, both spatial and temporal, is a challenge for all methods based on shadow maps. Aliasing in the shadow map leads to aliasing in the scattering integral. If in the next frame, a polygon edge is rasterized differently, that may cause a sudden jump in the calculated inscatter that manifests itself as a temporal artifact. A high-resolution shadow map can keep the aliasing to a minimum. In addition, while some method herein can introduce a little extra aliasing when rectifying the shadow map and when a camera ray is "quantized" to a specific epipolar slice. This aliasing is relatively minor, but might be seen on close examination. However, the aliasing in incremental integration is strictly greater: additional aliasing is introduced by the camera rectification and unrectification.

CONCLUSION

As explained herein, an acceleration data structure and methods of using it can render complex illumination in participating media and do it in parallel very fast.

The process can be run for real-time rendering volumetric shadows in single-scattering media. Overall, we achieve a significant speedup or better quality compared to other approaches. A simple acceleration data structure can be used to intersect camera rays with a shadow map, which is treated as a height field and using epipolar rectification of the shadow map, reduces the process from that of intersecting with a 2D height field to that of intersecting with 1D height fields. The 1D min-max mipmap can be used to find the lit segments for all pixels in the image. This data structure sacrifices worst-case guarantees but its simplicity allows for better exploitation of parallel processing capabilities of a GPU by processing all camera rays simultaneously. The methods scale well to large shadow map resolutions and, due to good use of the GPU, even to scenarios with highly complex visibility functions. The resulting algorithm is simple to implement and can be done using requires features available on current game consoles.

Further embodiments can be envisioned to one of ordinary skill in the art after reading the attached documents. For example, light rays can be sampled in various manners. In other embodiments, combinations or sub-combinations of the above disclosed embodiments can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the application as set forth in the claims.

What is claimed is:

1. A computer-implemented method for rendering a scene from a geometric model of elements in the scene, lighting and a participating volumetric medium, wherein the volumetric medium and lighting of such volumetric medium and scene is represented by electronically readable representative data, and rendering corresponds to generating pixel values from an image representing a view of the scene from a camera viewpoint, the method comprising:
   generating a rectified shadow map representing visibility from a light source in the scene that uses an epipolar rectification, wherein rows of the rectified shadow map correspond to epipolar slices of a corresponding shadow map;
   generating an approximation to visibility terms in a scattering integral;
   for each of a plurality of rows in the rectified shadow map, computing a static acceleration data structure, wherein the static acceleration data structure is static in that for at least some of camera rays, the static acceleration data structure is unchanged by processing for those at least some camera rays;
   for each of a plurality of camera rays, traversing the static acceleration data structure to find lit segments;
   for each of at least some of the plurality of camera rays, accumulating values for the scattering integral for that camera ray as calculated for lit segments, wherein the accumulated values for the scattering integral include a texture term;
   generating a rectified light texture map and precomputing prefix sums that depend on the texture term for each of the camera rays independent of the other of the camera rays, wherein the texture term varies as a function of the epipolar slice; and
   generating rendered pixel values that take into account accumulated values for the scattering integral for the plurality of camera rays.

2. The computer-implemented method of claim 1, further comprising computing scattering near an epipole of the rectified shadow map using brute force ray marching when the epipole is on or near a view plane region in the scene corresponding to a screen corresponding to the image being rendered.

3. The computer-implemented method of claim 1, further comprising:
   allocating computation for a plurality of the camera rays to a plurality of parallel operators; and
   providing access to the static acceleration data structure to each of the plurality of parallel operators, thereby allowing for calculations for at least two distinct camera rays to proceed independently.

4. The computer-implemented method of claim 1, further comprising repeating rectified shadow map generation for a second and subsequent light source.

5. The computer-implemented method of claim 1, further comprising:
   generating a depth map representing visibility from the camera viewpoint; and
   using the depth map when accumulating values for the scattering integral.

6. The computer-implemented method of claim 1, wherein generating a rectified shadow map comprises:
   generating the corresponding shadow map representing the visibility from the light source in the scene; and
   converting the corresponding shadow map using epipolar rectification to form the rectified shadow map.

7. The computer-implemented method of claim 1, wherein the static acceleration data structure is a binary 1D tree of 1D structures.

8. The computer-implemented method of claim 1, wherein the static acceleration data structure is a plurality of 1D min-max mipmaps, with a 1D min-max mipmap for each of a plurality of rows of the rectified shadow map.

9. The computer-implemented method of claim 1, wherein at least one step is performed using a graphical processing unit.

10. The computer-implemented method of claim 1, wherein accumulating values for the scattering integral includes approximating portions of the scattering integral using singular vectors of a singular value decomposition.

11. A rendering system for rendering a scene from a geometric model of elements in the scene, lighting and a participating volumetric medium, wherein the volumetric medium and lighting of such volumetric medium and scene is represented by electronically readable representative data, and rendering corresponds to generating pixel values from an image representing a view of the scene from a camera viewpoint, comprising:
   one or more processors associated with one or more computer systems; and
   a memory configured to store a set of instructions to be executed by the one or more processors, the set of instructions comprising:

instructions for generating a rectified shadow map representing visibility from a light source in the scene that uses an epipolar rectification, wherein rows of the rectified shadow map correspond to epipolar slices of a corresponding shadow map;

instructions for generating an approximation to visibility terms in a scattering integral;

instructions for computing, for each of a plurality of rows in the rectified shadow map, a static acceleration data structure, wherein the static acceleration data structure is static in that for at least some of camera rays, the static acceleration data structure is unchanged by processing for those at least some camera rays;

instructions for traversing, for each of a plurality of camera rays, the static acceleration data structure to find lit segments;

instructions for accumulating, for each of at least some of the plurality of camera rays, values for the scattering integral for that camera ray as calculated for lit segments, wherein the accumulated values for the scattering integral include a texture term;

instructions for generating a rectified light texture map and for precomputing prefix sums that depend on the texture term for each of the camera rays independent of the other of the camera rays, wherein the texture term varies as a function of the epipolar slice; and instructions for generating rendered pixel values that take into account accumulated values for the scattering integral for the plurality of camera rays.

12. The rendering system of claim 11, further comprising instructions for computing scattering near an epipole of the rectified shadow map using brute force ray marching when the epipole is on or near a view plane region in the scene corresponding to a screen corresponding to the image being rendered.

13. The rendering system of claim 11, further comprising:
storage for an acceleration data structure representing the 1D min-max mipmap independent of camera ray;
a graphical processing unit capable of at least two parallel operations;
instructions for allocating computation for a plurality of the camera rays to a plurality of GPU parallel operations; and
instructions for providing access to the acceleration data structure to each of the plurality of GPU parallel operations, thereby allowing for calculations for at least two distinct camera rays to proceed independently.

14. The rendering system of claim 11, further comprising instructions for repeating rectified shadow map generation for a second and subsequent light source.

15. The rendering system of claim 11, further comprising instructions for generating a depth map representing visibility from the camera viewpoint, such that the rendering system is configured for using the depth map when accumulating values for the scattering integral.

16. The rendering system of claim 11, wherein generating a rectified shadow map comprises:
instructions for generating the corresponding shadow map representing the visibility from the light source in the scene; and
instructions for converting the corresponding shadow map using epipolar rectification to form the rectified shadow map.

17. The rendering system of claim 11, wherein the static acceleration data structure is a binary 1D tree of 1D structures.

18. The rendering system of claim 11, wherein the static acceleration data structure is a plurality of 1D min-max mipmaps, with a 1D min-max mipmap for each of a plurality of rows of the rectified shadow map.

19. The rendering system of claim 11, further comprising a graphical processing unit for executing instructions of the rendering system.

20. The rendering system of claim 11, wherein instructions for accumulating values for the scattering integral include instructions for approximating portions of the scattering integral using singular vectors of a singular value decomposition and the rendering system further comprises storage for prefix sum tables.

21. A non-transitory computer-readable medium storing computer-executable program code for rendering a scene, wherein rendering corresponds to generating pixel values from an image representing a view of the scene from a camera viewpoint, the non-transitory computer-readable medium comprising:
code for reading a data structure storing a geometric model of elements in the scene, lighting and a participating volumetric medium, wherein the volumetric medium and lighting of such volumetric medium and scene is represented by electronically readable representative data;
code for generating a rectified shadow map representing visibility from a light source in the scene that uses an epipolar rectification, wherein rows of the rectified shadow map correspond to epipolar slices of a corresponding shadow map;
code for generating an approximation to visibility terms in a scattering integral;
code for computing, for each of a plurality of rows in the rectified shadow map, a static acceleration data structure, wherein the static acceleration data structure is static in that for at least some of camera rays, the static acceleration data structure is unchanged by processing for those at least some camera rays;
code for traversing, for each of a plurality of camera rays, the static acceleration data structure to find lit segments;
code for accumulating, for each of at least some of the plurality of camera rays, values for the scattering integral for that camera ray as calculated for lit segments, wherein the accumulated values for the scattering integral includes handling of a texture term,
code for generating a rectified light texture map and for precomputing prefix sums that depend on the texture term for each of the camera rays independent of the other of the camera rays, wherein the texture term varies as a function of the epipolar slice; and
code for generating rendered pixel values that take into account accumulated values for the scattering integral for the plurality of camera rays.

22. The non-transitory computer-readable medium of claim 21, further comprising code for computing scattering near an epipole of the rectified shadow map using brute force ray marching when the epipole is on or near a view plane region in the scene corresponding to a screen corresponding to the image being rendered.

23. The non-transitory computer-readable medium of claim 21, further comprising:
code for allocating computation for a plurality of the camera rays to a plurality of parallel operators; and
code for providing access to the static acceleration data structure to each of the plurality of parallel operators, thereby allowing for calculations for at least two distinct camera rays to proceed independently.

24. The non-transitory computer-readable medium of claim 21, further comprising code for repeating rectified shadow map generation for a second and subsequent light source.

25. The non-transitory computer-readable medium of claim 21, further comprising:
- code for generating a depth map representing visibility from the camera viewpoint; and
- code for accumulating values for the scattering integral using the depth map.

26. The non-transitory computer-readable medium of claim 21, wherein the code for generating a rectified shadow map comprises:
- code for generating the corresponding shadow map representing the visibility from the light source in the scene; and
- code for converting the corresponding shadow map using epipolar rectification to form the rectified shadow map.

27. The non-transitory computer-readable medium of claim 21, configured to process the static acceleration data structure as a binary 1D tree of 1D structures.

28. The non-transitory computer-readable medium of claim 21, configured to process the static acceleration data structure as a plurality of 1D min-max mipmaps, with a 1D min-max mipmap for each of a plurality of rows of the rectified shadow map.

29. The non-transitory computer-readable medium of claim 21, wherein at least some of the code is written for a graphical processing unit.

30. The non-transitory computer-readable medium of claim 21, wherein code for accumulating values for the scattering integral includes code for approximating portions of the scattering integral using singular vectors of a singular value decomposition.

31. The computer-implemented method of claim 1, further comprising generating a plurality of 1-D heightfields from the rectified shadow map.

32. The computer-implemented method of claim 31, wherein the acceleration structure is computed from the 1-D heightfield.

* * * * *